United States Patent [19]

Yasui et al.

[11] 4,252,727
[45] Feb. 24, 1981

[54] ESTERS OF AN ADDUCT OF DIOLEFINIC POLYMER AND UNSATURATED DICARBOXYLIC COMPOUND

[75] Inventors: Seimei Yasui, Ibaraki; Minoru Hino, Toyonaka; Kunio Izumi, Soka; Otsugu Hayashi, Kita Katsushika, all of Japan

[73] Assignee: Sumitomo Chemical Company, Limited, Osaka, Japan

[21] Appl. No.: 655,531

[22] Filed: Feb. 5, 1976

[30] Foreign Application Priority Data

Feb. 13, 1975 [JP] Japan ................................ 50-18623

[51] Int. Cl.$^3$ ...................... C07C 69/34; C07C 69/347
[52] U.S. Cl. .................................. 260/347.4; 560/81; 560/190; 560/193; 560/198; 560/201; 106/20; 106/287.24
[58] Field of Search .......... 260/475 SC, 485 R, 347.4; 560/190, 81, 193, 198, 201

[56] References Cited

U.S. PATENT DOCUMENTS 3,952,023   4/1976   Kaiya et al. ..................... 260/485 R Primary Examiner—Jane S. Myers
Attorney, Agent, or Firm—Birch, Stewart, Kolasch & Birch

[57] ABSTRACT

A resin for coatings, particularly useful as a medium for printing inks and paints, comprising a modified polymer produced by adding at least one $\alpha,\beta$-unsaturated dicarboxylic acid or anhydride thereof to at least one liquid conjugated diolefinic polymer having a number average molecular weight of 150 to 3,000, a viscosity of 2 to 5,000 cps at 30° C. and at least 50% of cis-1,4 structure and subjecting the resulting adduct to diesterification with at least one alcohol having 1 to 27 carbon atoms and whereby the acid value owing to the carboxyl group or the carboxylic anhydride group of the resulting modified polymer being made not more than 10.

4 Claims, No Drawings

ESTERS OF AN ADDUCT OF DIOLEFINIC POLYMER AND UNSATURATED DICARBOXYLIC COMPOUND

BACKGROUND AND SUMMARY OF THE INVENTION

The present invention relates to a novel resin useful for coatings. More particularly, it relates to a resin for coatings, i.e. useful as a medium for printing inks, paints or the like, which contains a modified polymer produced by adding an $\alpha,\beta$-unsaturated dicarboxylic acid or anhydride thereof to a liquid conjugated diolefinic polymer having at least 50% of cis-1,4 structure, wherein the carboxyl group or the carboxylic anhydride group of the resulting adduct is diesterified, and thereby the acid value of the modified polymer is made substantially not more than 10.

Generally, the printing inks useful as a coating composition comprises a pigment, a medium and an auxiliary, i.e. a regulator for giving the composition suitable workability, drying characteristics and usability.

The medium may be usually drying oils, natural resins, processing natural resins, synthetic resins, bituminous substances, waxes, celluloses, rubber derivatives, solvents and plasticizers. As the drying oils linseed oil is mainly used, but Chinese tung oil, perilla oil and soybean oil may also be used. The natural resins and the processing natural resins include rosins, hardened rosins, polymerized rosins, rosin esters, maleic resins and shellac. The synthetic resins include phenol resins, phenol resins modified with rosin, xylene resins, modifed alkyd resins, polyamide resins, and coumaronindene resins. There may be used other mediums, such as chlorinated rubber, cyclized rubber, nitrocellulose and various solvents.

The auxiliary agent includes a drier for promoting the drying of the composition (e.g. lead naphthenate, cobalt naphthenate), or a drying inhibitor, or a perfume, a ultraviolet absorber, or the like.

Besides, paints are used as a coating composition. The paints comprise a pigment (as a colorant); a medium, such as drying oils (e.g. tung oil, linseed oil, or dehydrated castor oil), semi-drying oils (e.g. soybean oil, tall oil, or fish oil), natural resins (e.g. rosin, copal-dammar gum, or shellac) and synthetic resins (e.g. phenol resin, melamine resin, urea resin, coumaron resin, acrylic resin, polyester resin, polyvinyl chloride resin, or alkyd resin); an appropriate solvent and a metallic drier for promoting the drying of the composition.

However, the natural drying oils and the natural semi-drying oils used for coating compositions, such as printing inks or paints, are variable with the weather or the harvest, and therefore, it is very difficult to supply constantly a large amount of the products having good qualities.

Accordingly, it has been desired to develop a synthetic oil having the same or more excellent qualities and properties than those of the natural drying oil or the natural semi-drying oil.

Owing to the recent development in the petrochemistry, butadiene or other materials are easily available. Besides, the present inventors have found a process for producing an improved liquid polymer from diolefins, such as butadiene or isoprene, and it has now been found that a modified polymer having excellent properties and being usable for coating composition instead of the conventional natural drying oils or natural semi-drying oils can be produced from the liquid polymer.

An object of the present invention is to provide an improved resin suitable for coating composition, such as printing inks or paints.

Another object of the invention is to provide a modified polymer having an acid value of not more than 10, i.e. an adduct of a liquid conjugated diolefinic polymer having at least 50% of cis-1,4 structure with an $\alpha,\beta$-unsaturated dicarboxylic acid or anhydride thereof wherein the carboxyl group or the carboxylic anhydride group is diesterified.

A further object of the invention is to provide a printing ink containing the modified polymer as set forth above.

A still further object of the invention is to provide a paint containing the modified polymer as set forth above.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The resin for coatings of the present invention contains a modified polymer having not more than 10 of an acid value owing to the carboxyl group or the carboxylic anhydride group, which is produced by adding an $\alpha,\beta$-unsaturated dicarboxylic acid or anhydride thereof to a liquid conjugated diolefinic polymer having a number average molecular weight of 150 to 3,000, a viscosity of 2 to 5,000 cps at 30° C. and not less than 50% of cis-1,4 structure and subjecting the resulting polymer adduct to diesterification.

The liquid polymer used in the present invention is characterized in that it has mainly cis-1,4 structure, which means that the present liquid polymer has an extremely lower viscosity in comparison with the conventional liquid polymer having predominantly vinyl structure. It is known that derivatives of a low molecular weight polybutadiene having predominantly vinyl structure are used for paints, but the derivatives have usually a high viscosity and therefore are limited in the use thereof. On the other hand, the liquid polymer having a wide range of molecular weight and having predominantly cis-1,4 structure of the present invention can be modified in the liquid state, and further, since it is liquid and has a low viscosity even after diesterified, it can give the desired ink or paint without using a diluent and can give a film having excellent toughness, plasticity and adhesion. Moreover, the liquid polybutadiene having predominantly cis-1,4 structure has a merit that in case of using as a printing ink it is easily cured when applied in a thickness of the film of 3 to 5$\mu$.

It is described in Japanese Patent Publication No. 11,195/1971 that a maleic anhydride adduct of a polybutadiene having predominantly vinyl structure, which is obtained by polymerizing butadiene in the presence of a catalyst system comprising an alkali metal, an organic compound of an alkali metal, an alkali metal-aromatic hydrocarbon complex, boron trifluoride etherate-water or a radical initiator, is semiesterified with an alcohol and then diesterified with an alkylene oxide to give an esterified compound containing a free hydroxy group in the molecule.

The maleic anhydride adduct of a polybutadiene has usually a higher viscosity with the increase of the addition amount of the maleic anhydride, which is, however, variable in accordance with the difference of the bonding manner of the butadiene unit in the polybutadiene. That is, the polybutadiene having vinyl structure shows extremely higher viscosity by the addition of maleic anhydride in comparison with the polybutadiene having cis structure. Accordingly, the polybutadiene having vinyl structure is remarkably restricted in the reactivity and in the utility thereof. For instance, the maleic anhydride adduct of a polybutadiene described in Japanese Patent Publication No. 11,195/1971 has a content of the combined maleic anhydride of about 8% (calculated from the acid value), a number average molecular weight of 970 and a viscosity of 20,000 cps at 25° C.

On the other hand, the maleic anhydride adduct of the liquid polybutadiene having predominantly cis structure (the content of the combined maleic anhydride: 8% and the number average molecular weight: 1,080) in the present invention has a viscosity of only 620 cps at 25° C., and when the adduct is diesterified according to the present invention, the viscosity thereof can be more reduced. For instance, as shown in Example 2 described hereinafter, the diesterified product derived from a liquid polybutadiene having predominantly cis-1,4 structure (the number average molecular weight: 1,000) shows a viscosity of 1,165 cps at 25° C., while the content of the maleic anhydride thereof is 20%.

When a resin is used as a vehicle for printing inks, the presence of free hydroxy group in the resin gives undesirable effect on the printability. The product described in Japanese Patent Publication No. 11,195/1971 contains necessarily one hydroxy group per each maleic anhydride unit, but on the other hand, the product of the present invention does not contain any free hydroxy group.

The starting liquid conjugated diolefinic polymer used for the adduct in the present invention contains at least 50% of cis-1,4 structure and 0.5 to 10% of vinyl structure and the remaining percent of trans-1,4 structure (in case of polyisoprene, 3,4 structure being less than 30%) and has a number average molecular weight of 150 to 3,000 and a viscosity of 2 to 5,000 cps, preferably 2 to 2,000 cps at 30° C.

Suitable examples of the liquid conjugated diolefinic polymer are a liquid polybutadiene, a liquid polyisoprene, a liquid copolymer of different kinds of conjugated diolefins, a liquid copolymer of a conjugated diolefin with a small amount of a monoolefin or an aromatic vinyl compound, or the like. In case of copolymer of butadiene or isoprene with styrene, the liquid copolymer contains not more than 40% by weight of styrene. These liquid conjugated diolefinic polymers can be produced by the methods described in Japanese Patent Laid Open Publication (without examination) Nos. 43,084/1973, 26,396/1974 and 89,788/1974, but any other method may be usable.

Other starting $\alpha,\beta$-unsaturated dicarboxylic acid or anhydride thereof used for the adduct in the present invention may be maleic acid, maleic anhydride, fumaric acid, itaconic acid, citraconic acid, or the like. Preferred one is maleic acid and maleic anhydride.

The adduct in the present invention can be produced by heating a mixture of at least one liquid conjugated diolefinic polymer and at least one $\alpha,\beta$-unsaturated dicarboxylic acid or anhydride thereof at an atmosphere of an inert gas at a temperature of 150° to 250° C. for 1 to 10 hours without using any catalyst. In this reaction, the $\alpha,\beta$-unsaturated dicarboxylic acid or anhydride thereof is quantitatively added to the liquid conjugated diolefinic polymer.

The adduct used in the present invention contains preferably 3 to 50% by weight, more preferably 10 to 40% by weight, of the $\alpha,\beta$-unsaturated dicarboxylic acid or anhydride thereof. When the content of the $\alpha,\beta$-unsaturated dicarboxylic acid or anhydride thereof is less than 3% by weight, the diesterified product derived from the adduct shows inferior properties, particularly insufficient compatibility with natural oils and fats or natural or synthetic resins and insufficient drying characteristics and film-forming properties, and on the other hand, when the content is over 50% by weight, the product derived therefrom has too high viscosity and can not practically be used.

The diesterification of the adduct of the liquid conjugated diolefinic polymer with the $\alpha,\beta$-unsaturated dicarboxylic acid or anhydride thereof can be carried out with alcohols having 1 to 27 carbon atoms. Suitable examples of the alcohols are saturated monovalent alcohols (e.g. methyl alcohol, ethyl alcohol, n-propyl alcohol, isopropyl alcohol, n-butyl alcohol, isobutyl alcohol, sec-butyl alcohol, tert-butyl alcohol, n-amyl alcohol, sec-amyl alcohol, diethylmethanol, isoamyl alcohol, tert-amyl alcohol, tert-butylmethanol, methylisopropylmethanol, n-hexyl alcohol, methylisobutylcarbinol, methylamylcarbinol, n-heptyl alcohol, methyl-n-amylcarbinol, n-octyl alcohol, capryl alcohol, 2-ethyl-n-hexyl alcohol, isooctyl alcohol, n-nonyl alcohol, n-decyl alcohol, n-undecyl alcohol, n-dodecyl alcohol, n-tridecyl alcohol, n-tetradecyl alcohol, n-pentadecyl alcohol, cetyl alcohol, stearyl alcohol, n-nonadecyl alcohol, behenyl alcohol, or cyclohexanol), unsaturated monvalent alcohols (e.g. allyl alcohol, propargyl alcohol, crotyl alcohol, oleyl alcohol, eraidyl alcohol, linoleyl alcohol, or geraniol), aromatic alcohols (e.g. benzyl alcohol, $\beta$-phenylethyl alcohol, or hydrocinnamyl alcohol), ether alcohols (e.g. ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, triethylene glycol monomethyl ether, furfuryl alcohol, or tetrahydrofurfuryl alcohol), or the like, which may be used alone or in a mixture of two or more kinds thereof. Among these alcohols, preferred one is the alcohol having 2 to 18 carbon atoms. Besides, divalent alcohols (e.g. ethylene glycol, diethylene glycol, propylene glycol, propanediol, or butanediol) may be used unless the product shows so high viscosity that the product is hardly used.

The diesterification reaction of the adduct with alcohols can be carried out in the conventional manner, for instance, by reacting the adduct with a somewhat excess amount, preferably 20 to 50 molar percent excess amount, of the alcohol at a temperature of 50° to 250° C., preferably 100° to 200° C., for 30 minutes to 8 hours in the presence of a catalyst such as inorganic acid (e.g. sulfuric acid, or hydrochloric acid) or an organic acid (e.g. para-toluenesulfonic acid), while the by-produced water is taken out from the reaction system. An appropriate solvent may be used in the reaction.

According to the above diesterification of the carboxyl group or the carboxylic anhydride group in the adduct, the modified polymer shows not more than 10 of an acid value owing to the carboxyl group or the carboxylic anhydride group. When the acid value of the polymer is over 10, the product shows undesirably inferior water resistance.

It is very important for obtaining the desired coating composition having excellent properties that the resin satisfies the above-mentioned conditions. That is, there are known some liquid conjugated diolefinic polymers, but they are not suitable for the coating composition of the present object because of the inferior dispersibility with pigments and the inferior compatibility with other various resins, natural drying oils or semi-drying oils. When the conventional liquid conjugated diolefinic polymers are used for the coating composition in the form of an adduct thereof with an α,β-unsaturated dicarboxylic acid or anhydride thereof, the dispersibility with pigments and the compatibility with other resins are improved, but on the contrary, the acid value thereof becomes more than 30, and as the result, the stability thereof with pigments is remarkably reduced to induce the phrase separation, and further, owing to the rapid increase of the viscosity thereof, they are hardly used as the medium for printing inks or paints. Besides, in order to decrease the viscosity, the adduct of the conventional liquid conjugated diolefinic polymer with an α,β-unsaturated dicarboxylic acid or anhydride thereof may be reacted with an alcohol to give a semi-esterified product, but the product is still not practically usable for coating compositions because it has still inferior stability with pigments owing to the high acid value thereof and further shows inferior water resistance.

The resin for coating of the present invention comprising the modified polymer, i.e. the adduct of the liquid conjugated diolefinic polymer with the α,β-unsaturated dicarboxylic acid or anhydride thereof wherein the carboxyl group or the carboxylic anhydride group is diesterified is useful as a medium for printing inks and paints. When the resin of the present invention is used as one component of the printing inks or paints, it shows an excellent compatibility with the other various resinous components contained therein, and the resulting printing inks and paints show excellent characteristics. For instance, it is used for a printing ink for offset printing, the product shows an excellent adhesion onto the paper, particularly excellent drying characteristics, and therefore there can be obtained a good print having an excellent gloss. Moreover, the printing ink containing the resin of the present invention is remarkably excellent in the elimination of the dirts which occur in case of losing the balance between the dampening solution and the addition amount of the printing ink during the printing in comparison with the conventional printing ink containing the drying oil. Besides, the paint containing the resin of the present invention can give a glossy coating layer having excellent properties.

The printing ink of the present invention contains 3 to 50% by weight of the present resin and further an appropriate amount of the other components used in the conventional printing inks as mentioned hereinbefore, such as pigments, solvents, resins (e.g. natural resins, phenol resins, or xylene resins), driers, ultraviolet absorbents, or the like.

The paint of the present invention contains 5 to 80% by weight of the present resin and further an appropriate amount of the other components used in the conventional paints as mentioned hereinbefore, such as pigments, and optionally solvents, resins (e.g. phenol resins, alkyd resins), metallic driers, or the like.

The present invention is illustrated by the following Examples but is not limited thereto.

EXAMPLE 1

A 500 ml three-necked flask provided with a stirrer, a thermometer and a three-way cock for sealing an inert gas is charged with a liquid polybutadiene (viscosity: 102 cps at 30° C., number average molecular weight measured by a vapor pressure osmometer: 1,000, iodine value (Wijs method): 463, cis-1,4 structure: 56%, trans-1,4 structure: 33% and vinyl structure: 11%, 280 g) and maleic anhydride (120 g). After replacing the air in the flask with nitrogen gas, the mixture is reacted at 190° C. for 4 hours under the nitrogen pressure to give a maleic acid adduct of the liquid polybutadiene (Gardner's color standard: 5-6).

The maleic acid adduct thus obtained (100 g) and 2-ethylhexanol (120 g) are charged into a 300 ml four-necked flask provided with a stirrer, a thermometer, a condenser and a tube for blowing an inert gas, and thereto is added 50% sulfuric acid (as a catalyst, 0.3 ml). The mixture is heated at 150°-170° C. until the acid value of the reaction mixture becomes not more than 10 (the acid value owing to sulfuric acid is deducted), while the by-produced water is taken out from the reaction system through the condenser. After the reaction, the residual catalyst is neutralized with an alkali and the inorganic substances are removed off by filtration. The filtrate is condensed under reduced pressure for removing the excess alcohol and other substances having a low boiling point, and thereby the desired esterified product is obtained.

The esterified product thus obtained shows the acid value: 3.1, the saponification value: 160 and the viscosity: 3,800 cps at 25° C., and has an excellent compatibility with #5 solvent (made by Nippon Petrochemicals Co., Ltd., aniline point: about 73) in the wide range, which mixture is transparent.

The esterified product (100 parts by weight) is kneaded with titanium white (100 parts by weight), cobalt naphthenate (0.03 part by weight, based on the metal) and lead naphthenate (0.3 part by weight, based on the metal) to give a liquid composition.

The composition thus obtained is applied to a glass plate in a thickness of about 0.04 mm and allowed to stand at room temperature. After about 3 hours, it becomes tack free (i.e. when the coating layer is slightly pressed with finger, no fingerprint leaves), and a good glossy coating film is obtained.

For comparison purpose, linseed oil is used instead of the esterified product in the above test, the coating layer becomes tack free after 6 hours. From these results, it is clear that the composition of the present invention has more excellent drying characteristics in comparison with the conventional composition.

EXAMPLE 2

A 500 ml three-necked flask provided with a stirrer, a thermometer and a three-way cock for sealing an inert gas is charged with a liquid polybutadiene (viscosity: 102 cps at 30° C., number average molecular weight measured by a vapor pressure osmometer: 1,000, iodine value (Wijs method): 463, cis-1,4 structure: 56%, trans-1,4 structure: 33% and vinyl structure: 11%, 320 g) and maleic anhydride (80 g). After replacing the air in the flask with nitrogen gas, the mixture is reacted at 190° C.

for 4 hours under the nitrogen pressure to give a maleic acid adduct of the liquid polybutadiene (Gardner's color standard: 5–6, viscosity: 55,000 cps at 25° C.).

The maleic acid adduct thus obtained (100 g) and 2-ethylhexanol (64 g) are charged into a 300 ml four-necked flask provided with a stirrer, a thermometer, a condenser and a tube for blowing an inert gas, and thereto is added 50 % sulfuric acid (as a catalyst, 0.3 ml). The mixture is heated at 150°–170° C. until the acid value of the reaction mixture becomes not more than 10 (the acid value owing to sulfuric acid is deducted), while the by-produced water is taken out from the reaction system through the condenser. After the reaction, the residual catalyst is neutralized with an alkali and the inorganic substances are removed off by filtration. The filtrate is condensed under reduced pressure for removing the excess alcohol and other substances having a low boiling point, and thereby the desired esterified product is obtained.

The esterified product thus obtained shows the acid value: 3.1, the saponification value: 140 and the viscosity: 1,165 cps at 25° C., and has an excellent compatibility with #5 solvent (made by Nippon Petrochemicals Co., Ltd., aniline point: about 73) in the wide range, which mixture is transparent.

The esterified product (100 parts by weight) is kneaded with titanium white (100 parts by weight), cobalt naphthenate (0.03 part by weight, based on the metal) and lead naphthenate (0.3 part by weight, based on the metal) to give a liquid composition.

The composition thus obtained is applied to a glass plate in a thickness of about 0.04 mm and allowed to stand at room temperature. After about 3 hours, it becomes tack free (i.e. when the coating layer is slightly pressed with finger, no fingerprint leaves), and a good glossy coating film is obtained.

For comparison purpose, linseed oil is used instead of the esterified product in the above test, the coating layer becomes tack free after 6 hours, From these results, it is clear that the composition of the present invention has more excellent drying characteristics in comparison with the conventional composition.

EXAMPLE 3

By using the esterified product obtained in Example 1 or 2, a resin varnish for printing ink is prepared according to the following formulation:

| | |
|---|---|
| (a) Phenol resin modified with rosin (Hitanol ® 260, made by Hitachi Chemical Co., Ltd.) | 30 parts by weight |
| (b) Esterified product | 35 parts by weight |
| (c) #5 solvent (made by Nippon Petrochemicals Co., Ltd.) | 30 parts by weight |

The components (a) and (b) are mixed and dissolved by heating at the cracking temperature of 250°±3° C. for 30 minutes. After cooling, to the mixture is added the component (c) to give the resin varnish (hereinafter, referred to as "Resin Varnish A").

A printing ink is prepared by a conventional method according to the following formulation:

| | |
|---|---|
| Carbon black (MA-50, made by Mitsubishi Chemical Industries, Ltd.) | 20 parts by weight |
| Resin Varnish A | 65 parts by weight |
| Alkali Blue Toner (made by Hoechst) | 3 parts by weight |
| #5 solvent | 12 parts by weight |

The printability of the printing ink thus obtained is tested under the following conditions:

| | |
|---|---|
| Printing press: | Lithographic, sheet feed, single color press |
| Printing speed: | 5,000 sheets/hour |
| Plate: | PS plate |
| Dampening solution: | pH 5.5 |
| Paper: | Art paper |
| Number of printing sheets: | 20,000 sheets |

As a result, the printing can be satisfactorily done and the printed material has good qualities.

EXAMPLE 4

The esterified product obtained in Example 2 (60 parts by weight) is kneaded well with a phenol resin modified with rosin (40 parts by weight), titanium white (100 parts by weight), by cobalt naphthenate (0.03 part by weight, based on the metal) and lead naphthenate (0.3 part by weight, based on the metal) to give a liquid composition. On this liquid composition, the drying characteristics are tested at room temperature in the same manner as described in Example 1. As the result, the coating layer becomes tack free at about 4 hours and is completely cured at about 8 hours to give a good, glossy coating film.

For comparison purpose, linseed oil is used instead of the esterified product in the above test, the coating layer becomes tack free after about 6 hours and is completely cured after 20 hours or more.

EXAMPLE 5

Into a 300 ml four-necked flask provided with a stirrer, a thermometer, a condenser and a tube for blowing an inert gas are charged the maleic acid adduct obtained in Example 1 (100 g), n-butyl alcohol (68 g) and 50% sulfuric acid (0.3 ml). The mixture is reacted at 100–105° C. until the acid value (that owing to sulfuric acid is deduced therefrom) becomes not more than 10. After the reaction, the residual catalyst is neutralized, filtered and de-salted. The filtrate is condensed under reduced pressure for removing the excess alcohol and other substances having a low boiling point, and thereby the desired esterified product is obtained. The esterified product thus obtained shows the acid value: 2.2, the saponification value: 170 and the viscosity: 2,200 cps at 25° C., and has an excellent compatibility with #5 solvent (aniline point: about 73) in the wide range, which mixture is transparent.

The esterified product (100 parts by weight) is kneaded well with titanium white (100 parts by weight), cobalt naphthenate (0.03 part by weight, based on the metal) and lead naphthenate (0.3 part by weight, based on the metal) to give a liquid composition. On this liquid composition, the drying characteristics are tested at room temperature in the same manner as described in Example 1. As the result, the coating layer becomes tack free at about 3 hours and is completely cured at about 7 hours to give a good, glossy coating film.

EXAMPLE 6

Into a 300 ml four-necked flask provided with a stirrer, a thermometer, a condenser and a tube for blowing an inert gas are charged the maleic acid adduct obtained in Example 1 (100 g), n-butyl alcohol (45 g) and 50% sulfuric acid (0.3 ml). The mixture is reacted at 100–105° C. until the acid value (that owing to sulfuric acid is deduced therefrom) becomes not more than 10. After the reaction, the residual catalyst is neutralized, filtered and de-salted. The filtrate is condensed under reduced pressure for removing the excess alcohol and other substances having a low boiling point, and thereby the desired esterified product is obtained. The esterified product thus obtained shows the acid value: 2.2, the saponification value: 170, iodine value: 250 and the viscosity: 1,500 cps at 25° C., and has an excellent compatibility with #5 solvent (aniline point: about 73) in the wide range, which mixture is transparent.

The esterified product (100 parts by weight) is kneaded well with titanium white (100 parts by weight), cobalt naphthenate (0.03 part by weight, based on the metal) and lead naphthenate (0.3 part by weight, based on the metal) to give a liquid composition. On this liquid composition, the drying characteristics are tested at room temperature in the same manner as described in Example 1. As the result, the coating layer becomes tack free at about 3 hours and is completely cured at about 7 hours to give a good, glossy coating film.

EXAMPLE 7

A 500 ml three-necked flash provided with a stirrer, a thermometer and a three-way cock for sealing an inert gas is charged with the same liquid polybutadiene (360 g) as used in Example 1 and maleic anhydride (40 g), and the mixture is treated in the same manner as described in Example 1 to give a maleic acid adduct having the viscosity: 850 cps at 25° C. and the Gardner's color standard: 4–5.

The maleic acid adduct thus obtained (100 g) is esterified with dodecyl alcohol (42 g) in the same manner as described in Example 1 to give the desired esterified product having the viscosity: 530 cps at 25° C., the acid value: 3.9, the saponification value: 70 and the Gardner's color standard: 3–4. The esterified product has an excellent compatibility with #5 solvent (aniline point: about 73) in the wide range, which mixture is transparent.

The esterified product is treated in the same manner as described in Example 1 to give the liquid composition. When the drying characteristics of the liquid composition are tested at room temperature in the same manner as described in Example 1, the coating layer becomes tack free at 4.5 hours.

EXAMPLE 8

In the same manner as described in Example 1, a maleic acid adduct of a liquid polybutadiene (viscosity: 100,000 cps or more at 25° C., Gardner's color standard: 12–13) is produced from a liquid polybutadiene (viscosity: 42 cps at 30° C., number average molecular weight measured by a vapor pressure osmometer: 600, iodine value (Wijs method): 460, cis-1,4 structure: 53 %, trans-1,4 structure: 35% and vinyl structure: 12%, 140 g) and maleic anhydride (60 g).

The maleic acid adduct thus obtained (100 g) is reacted with 2-ethylhexanol (96 g) in the same manner as described in Example 1. The esterified product thus obtained has the viscosity: 3,000 cps at 25° C., the acid value: 5.7, the saponification value: 180 and the Gardner's color standard: 7–8, and has an excellent compatibility with #5 solvent (aniline point: about 73) in the wide range, which mixture is transparent.

The esterified product (60 parts by weight) and an oil-modified alkyd resin (40 parts by weight) are treated in the same manner as described in Example 1 to give a liquid composition. On this liquid composition, the drying characteristics are tested at room temperature in the same manner as described in Example 1. As the result, the coating layer becomes tack free at about 4.5 hours to give a good, glossy coating film.

The esterified products obtained in Examples 2 and 3 to 8 have excellent solubility in various organic solvents, natural oils and processing oils and fats (e.g. cyclopentadiene-modified oil) and further good compatibility with various resins, such as alkyd resin, phenol resin, phenol resin modified with rosin, maleic resin, maleic resin modified with rosin, ester resin, ester resin modified with rosin, or the like, as well as the esterified product obtained in Example 1, and they can be used as a vehicle for rapidly drying printing inks.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A resin comprising a modified polymer consisting of an adduct of at least one conjugated diolefinic polymer which is a member selected from the group consisting of a liquid polybutadiene, a liquid polyisoprene, a liquid butadiene-isoprene copolymer, a liquid butadiene-styrene copolymer and a liquid isoprene-styrene copolymer and has a number average molecular weight of 150 to 3000, a viscosity of 2 to 5000 cps at 30° C. and at least 50% of cis 1,4-structure with at least one $\alpha,\beta$-unsaturated dicarboxylic acid or anhydride thereof which is a member selected from the group consisting of maleic acid, maleic anhydride, fumaric acid, itaconic acid and citraconic acid, wherein the adduct contains 3 to 50% by weight of the $\alpha,\beta$-unsaturated dicarboxylic acid or anhydride thereof, wherein the carboxyl group or the anhydride group is diesterfied after the adduct is obtained and thereby the acid value of the resulting modified polymer is made to be not more than 10.

2. The resin according to claim 1, wherein the $\alpha,\beta$-unsaturated dicarboxylic acid or anhydride thereof is a member selected from the group consisting of maleic acid and maleic anhydride.

3. The resin according to claim 1, wherein the diesterification is done with at least one alcohol having 1 to 27 carbon atoms.

4. The resin according to claim 3, wherein the alcohol is a member selected from the group consisting of methyl alcohol, ethyl alcohol n-propyl alcohol, isopropyl alcohol, n-butyl alcohol, isobutyl alcohol, sec-butyl alcohol, tert-butyl alcohol, n-amyl alcohol, sec-amyl alcohol, diethyl-methanol, isoamyl alcohol, tert-amyl alcohol, tert-butylmethanol, methylisopropylmethanol, n-heptyl alcohol, methyl-n-amylcarbinol, n-octyl alcohol, capryl alcohol, 2-ethyl-n-hexyl alcohol, isooctyl alcohol, n-nonyl alcohol, n-decyl alcohol, n-undecyl alcohol, n-dodecyl alcohol, n-tridecyl alcohol, n-tetradecyl alcohol, n-pentadecyl alcohol, cetyl alcohol, stearyl alcohol, n-nonadecyl alcohol, behenyl alcohol, cyclohexanol, allyl alcohol, propargyl alcohol, crotyl alcohol, oleyl alcohol, eraidyl alcohol, lineoleyl alcohol, geraniol, benzyl alcohol, β-phenylethyl alcohol, hydrocinnamyl alcohol, ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, triethylene glycol monomethyl ether, furfuryl alcohol, tetrahydrofurfuryl alcohol, ethylene glycol, diethylene glycol, propylene glycol, propanediol and butanediol and a mixture of two or more kinds thereof.

* * * * *